: # 3,003,916
VINYL PHOSPHATE INSECTICIDES

Everett E. Gilbert, Morris Township, Morris County, Julian A. Otto, Lake Tamarack, and Edmund J. Rumanowski, Jersey City, N.J., assignors to Allied Chemical Corporation, New York, N.Y., a corporation of New York
No Drawing. Filed June 10, 1958, Ser. No. 740,996
20 Claims. (Cl. 167—30)

This invention relates to the production of new vinyl phosphate compounds useful as active insecticidal toxicants.

Accordingly, one object of the invention is to provide new chemical compounds in the form of vinyl phosphates. Another object is the provision of novel vinyl phosphate compounds for application as insecticides. Other objects and advantages of the invention will be apparent hereinafter.

In accordance with the above objects, the invention of this application is directed to compounds of the general formula:

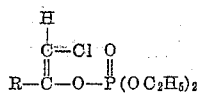

in which R is a member of the group consisting of dichlorophenyl and 2-fluoro-5-bromophenyl radicals.

The preferred compounds of the invention are those where R is 2,4-dichlorophenyl or 2,5-dichlorophenyl. These compounds have been found to be of considerable value as insecticides and particularly as insecticides of the systemic type. However, R may also represent 3,4-dichlorophenyl, 2,6-dichlorophenyl or 2-fluoro-5-bromophenyl.

The vinyl phosphate compounds of the invention are prepared by reacting a dichlorophenyl dichloromethyl ketone or 2-fluoro-5-bromophenyl dichloromethyl ketone with triethyl phosphite. This reaction may be represented by the following equation in which R represents a dichlorophenyl or 2-fluoro-5-bromophenyl radical:

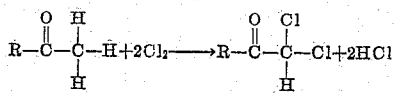

It is preferred to prepare the vinyl phosphate compounds by adding triethyl phosphite dropwise to a dichlorophenyl dichloromethyl ketone or 2-fluoro-5-bromophenyl dichloromethyl ketone with stirring and cooling to maintain the reaction temperature at about 30° to 60° C. After addition of the phosphite, the reaction mixture is then held for about 2 to 5 hours at a temperature of about 30° to 95° C.

Although the ketone and triethyl phosphite may be charged in molar proportions of 1 mol of ketone to about 1 to 1.5 mols of triethyl phosphite, approximately equimolar proportions of the reactants are preferred.

If desired, the reaction may be carried out in the presence of an inert organic solvent, preferably one lower boiling than the vinyl phosphate produced. Suitable organic solvents include benzene, acetone, toluene, ethanol and methanol. When the reaction is completed, lower boiling solvent so used may be recovered for reuse by simple distillation at atmospheric or lower pressure.

The reaction may be carried out at any temperature up to the decomposition point of the reactants but is preferably carried out at about 30° to 95° C. Generally, the reaction is quite vigorous during the addition of the reactants, and cooling is desirable to retard the reaction. As is apparent from the above equation illustrating the reaction of ketone with triethyl phosphite, ethyl chloride is formed. This by-product may be readily removed from the reaction mixture by simple distillation procedure.

The dichlorophenyl dichloromethyl ketone or 2-fluoro-5-bromophenyl dichloromethyl ketone employed for reaction with the triethyl phosphite may be readily prepared by chlorination of a dichlorophenyl methyl ketone or 2-fluoro-5-bromophenyl methyl ketone in accordance with the following equation in which R is a dichlorophenyl or 2-fluoro-5-bromophenyl radical:

$$R-\overset{O}{\overset{\|}{C}}-\overset{H}{\overset{|}{\underset{H}{C}}}-H+2Cl_2 \longrightarrow R-\overset{O}{\overset{\|}{C}}-\overset{Cl}{\overset{|}{\underset{H}{C}}}-Cl+2HCl$$

It is preferred to prepare the ketone reactants by subjecting a dichlorophenyl methyl ketone or 2-fluoro-5-bromophenyl methyl ketone to the action of chlorine in the presence of ultra-violet light for about 1.5 to 4 hours over a temperature range of about 120° to 140° C. After completion of the reaction, the ketone is purified by vacuum distillation.

The vinyl phosphate compounds of this invention are insoluble in water but soluble in acetone, alcohol, propylene glycol, corn oil, kersosene and xylene.

The following examples are given for the purpose of illustrating the present invention but are not intended to be limiting on the scope thereof. In the examples, parts are by weight.

EXAMPLE 1

31 parts of 2,5-dichlorophenyl dichloromethyl ketone were placed in a reaction vessel provided with a stirrer and a water bath. 22 parts of triethyl phosphite were added dropwise to the vessel over a 20-minute period with stirring and cooling to maintain the reaction mixture at a temperature of 40° C.±5° C. The bath was removed, and the reaction temperature rose to about 55° C. and then slowly dropped. The reaction mixture was held at room temperature for about 5 hours, and the ethyl chloride formed during the reaction, as well as unreacted triethyl phosphite, was stripped off. Finally, the reaction mixture was distilled at 1 mm. mercury pressure to a final temperature of 150° C. 42 parts of an oil comprising the vinyl phosphate compound having the following formula was obtained as residue. This amount of vinyl phosphate compound constituted about 95% of theory.

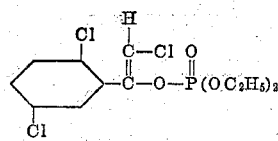

The product has the following properties:

Distills at—165°–167° C./1.5 mm. Hg.
Percent Cl found—29.7 (theory, 29.6).

Percent P found—8.6 (theory, 8.7).
Infrared analysis shows the presence of the vinyl structure.
Hydrolysis with concentrated HCl yields a product distilling at 110°–115° C./2 mm. Hg. This is identified as 2,5-dichlorophenyl monochloromethyl ketone by comparing it with a known sample by infrared analysis.

The 2,5-dichlorophenyl dichloromethyl ketone reactant was prepared in the following manner: 58 parts of 2,5-dichlorophenyl methyl ketone were charged into a reaction vessel equipped with a gassing tube, a stirrer and a condenser with hydrogen chloride trap. Chlorine gas was introduced in the presence of ultra-violet light over a period of 1½ hours at a temperature of 120°–125° C., and then for a further period of 3 hours at a temperature of 130°–135° C. 79.5 parts of a liquid comprising 2,5-dichlorophenyl dichloromethyl ketone were obtained.

EXAMPLE 2

12.9 parts of 2,4-dichlorophenyl dichloromethyl ketone were placed in a reaction vessel provided with a stirrer and a water bath. 9 parts of triethyl phosphite were added dropwise over a 5-minute period with stirring and cooling to maintain the reaction mixture at a temperature of 45°–55° C. The bath was removed, and the reaction mixture was heated to a temperature of about 80° C. in about 3 hours. The reaction mixture was then stripped free of ethyl chloride by-product and any unreacted triethyl phosphite. 18.5 parts of an oil comprising the vinyl phosphate compound having the following formula were obtained as residue:

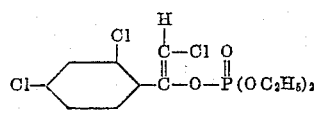

The amount of vinyl phosphate compound obtained constituted about 103% of theory.
The product has the following properties:

Distills at—163°–164° C./1.5 mg. Hg.
Percent Cl found—29.0 (theory, 29.6).
Percent P found—8.6 (theory, 8.7).
Infrared analysis shows the presence of the vinyl structure.
Hydrolysis with concentrated HCl yields a product distilling at 110°–115° C./2 mm. Hg. This is identified as 2,4-dichlorophenyl monochloromethyl ketone by comparing it with a known sample by infrared analysis.

The 2,4-dichlorophenyl dichloromethyl ketone reactant was prepared in the following manner: 95 parts of 2,4-dichlorophenyl methyl ketone were charged into a reaction vessel equipped with a gassing tube, a stirrer and a condenser with hydrogen chloride trap. Chlorine gas was introduced into the reaction vessel in the presence of ultra-violet light for a period of 1½ hours at a temperature of 120°–140° C. The resulting reaction product comprised 128 parts. 64 parts of the reaction product were vacuum distilled at 7–8 mm. mercury pressure and a temperature of 146°–153° C. to produce 56 parts of 2,4-dichlorophenyl dichloromethyl ketone as residue.

EXAMPLE 3

12.9 parts of 2,6-dichlorophenyl dichloromethyl ketone were placed in a reaction vessel provided with a stirrer and a water bath. 8.3 parts of triethyl phosphite were added with stirring and cooling to maintain the reaction mixture at a temperature of 50°–60° C. The reaction mixture was heated to a temperature of 90° C.±5° C. and held there for 2 hours. By-product ethyl chloride and unreacted triethyl phosphite were stripped off. 18 parts of a light oil comprising the following vinyl phosphate compound were obtained as residue:

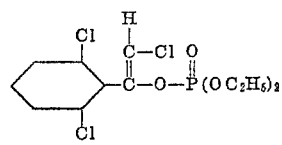

The amount of vinyl phosphate compound obtained constituted 100% of theory.

The 2,6-dichlorophenyl dichloromethyl ketone reactant was prepared in the following manner: 56 parts of 2,6-dichlorophenyl methyl ketone were charged into a reaction vessel equipped with a gassing tube, a stirrer and a condenser with hydrogen chloride trap. Chlorine gas was introduced in the presence of ultra-violet light over a period of 4 hours at a temperature of 120–140° C. and then over an additional period of 3 hours at a temperature of 150° C. 77.5 parts of product were obtained. Upon distillation of this product 61 parts of 2,6-dichlorophenyl dichloromethyl ketone came over at 2.3 mm. mercury pressure and a temperature of 125°–129° C.

EXAMPLE 4

14.3 parts of 2-fluoro-5-bromophenyl dichloromethyl ketone were placed in a reaction vessel provided with a stirrer and a water bath. 8.3 parts of triethyl phosphite were added with stirring and cooling to maintain the reaction mixture at a temperature of 50°–60° C. The reaction mixture was heated to a temperature of 90° C.±5° C. and held there for 2 hours. By-product ethyl chloride and unreacted triethyl phosphite were stripped off. 21 parts of an oil comprising the following vinyl phosphate compound were obtained as residue:

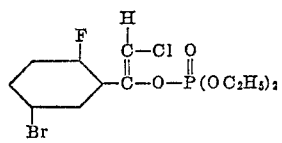

The amount of vinyl phosphate compound obtained constituted about 108% of theory.

The 2-fluoro-5-bromophenyl dichloromethyl ketone was prepared in the following manner: 47.5 parts of 2-fluoro-5-bromophenyl methyl ketone were charged into a reaction vessel equipped with a gassing tube, a stirrer and a condenser with hydrogen chloride trap. Chlorine gas was introduced in the presence of ultra-violet light over a period of 1½ hours at a temperature of 120°–130° C. 61.5 parts of a liquid comprising 2-fluoro-5-bromophenyl dichloromethyl ketone were obtained.

As indicated above, the vinyl phosphate compounds of this invention find valuable application as active insecticidal toxicants. For example, these compounds, when applied to the skin of cattle, have been found to be particularly effective in repelling or killing stable flies. The compounds are ordinarily applied as insecticidal toxicants, in conjunction with a carrier which may be a solid, liquid or gaseous material. The vinyl phosphate compounds may be employed either in the form of aqueous sprays or dust compositions, and the amount of toxicant used may vary, a sufficient quantity being utilized to provide the required toxicity.

When employed in the form of a powder or dust for killing insects, the above compounds or toxicants may be mixed with a substantial proportion of any suitable inert material or diluent, preferably in finely divided form, such as known grades of prepared insecticide carrier clays, pyrophyllite, fuller's earth, bentonite, sulfur, lime, talc, whiting, diatomaceous earth, etc. Suitable dusts of this type usually contain not less than 0.5% and preferably not more than 10% by weight of toxicant.

Liquid insecticide sprays containing the toxicants of the invention may be prepared by first forming a solution of the compound in a suitable organic solvent, e.g., xylene, methylated naphthalenes, or any highly aromatic petroleum type insecticide oil, and preferably adding a small amount of wetting or emulsifying agent commonly employed in the art, such as diglycol oleate or p-isooctyl phenyl ether of polyethylene glycol. The resulting concentrate solution is incorporated with water in quantity sufficient to form an aqueous spray dispersion or emulsion having the desired active ingredient concentration.

In a preferred embodiment, aqueous spray dispersions or suspensions may be formed by incorporating in water dry mixtures or so-called wettable spray powders containing the vinyl phosphate compounds of the invention. These mixtures may also include inert diluents, suitable quantities of wetting and dispersing agents, and if desired, secondary toxicants.

The aqueous spray dispersions of the invention preferably should contain the active ingredient in an amount not less than $1/32$ of a pound per hundred gallons of spray, the more usual concentrations being in the range of $1/16$ to $1/2$ of a pound per hundred gallons of spray.

The vinyl phosphate compounds of this invention are not only effective for killing insects which invade plants when applied in the usual manner, i.e., directly to the insects or to the portions of the host plants they infest, but are also extremely toxic when used as systemic toxicants. This effect constitutes one of the outstanding characteristics of the vinyl phosphate compounds. In such use, the toxicant, with or without a suitable carrier or diluent, can be applied to soil in the vicinity of the growing plant to be protected, the toxicant being absorbed from the soil by the plant. Alternatively, the toxicant can be applied directly to portions of the plant where it is again absorbed and distributed throughout the plant tissues, including portions not directly treated. In either case the whole plant then becomes toxic to insects which feed on it.

Following Table I shows the results of tests relating to the topical application to insects of vinyl phosphate compounds typical of those embraced within the scope of this invention:

Table I

| Toxicant | Mexican bean bettle larvae— Toxicity [1] | Mexican bean bettle adults— Toxicity [1] |
| --- | --- | --- |
| Vinyl phosphate of Example 1 | <1.56 | 1.4–3.9 |
| Vinyl phosphate of Example 2 | <1.56 | <1.4 |
| "Parathion" [2] | 25–50 | 7.8–15.6 |
| "Malathion" [3] | >50 | 15.6–31.2 |

[1] Micrograms of toxicant required to kill 50% of the insects.
[2] A commercial insecticide comprising p-nitrophenyldiethyl thionophosphate.
[3] A commercial insecticide comprising O,O-dimethyl phosphate of diethyl mercapto succinate.

This table shows that vinyl phosphate compounds coming within the scope of the present invention are far more toxic than two well-known commercial insecticides.

Following Table II shows comparative insecticide activity of formulations of vinyl phosphate compounds typical of those embraced within the scope of this invention:

Table II

| Toxicant | Formulation | Mexican bean beetle | |
| --- | --- | --- | --- |
| | | Larvae percent kill [3] | Adults percent kill [4] |
| Vinyl phosphate of Example 1 | 1 part vinyl phosphate composition [2] in 15,358 parts $H_2O$. | 100 | |
| Vinyl phosphate of Example 1 | 1 part vinyl phosphate composition [2] in 10,239 parts $H_2O$. | | 100 |
| Vinyl phosphate of Example 2 | 1 part vinyl phosphate composition [2] in 15,358 parts $H_2O$. | 93.4 | |
| Vinyl phosphate of Example 4 | 1 part vinyl phosphate composition [2] in 20,439 parts $H_2O$. | 100 | |
| "Phosdrin" [1] | 1 part "Phosdrin" composition [2] in 15,358 parts $H_2O$. | 20 | |
| "Phosdrin" [1] | 1 part "Phosdrin" composition [2] in 10,239 parts $H_2O$. | | 0 |

[1] A commercial insecticide comprising the alpha isomer of 2-carbomethoxy-1-methylvinyl dimethyl phosphate 60%, related compounds 40%.
[2] 4.8 grams of vinyl phosphate or "Phosdrin" compound dissolved in acetone to 100 cc.
[3] The tests on toxicity to Mexican bean beetle larvae were run by spraying horticultural (cranberry) bean plants with the indicated formulation. After spraying, deposits were allowed to dry on the plants, and 3rd-instar larvae were confined on the plants with screen wire spheres. Percent kill was recorded 3 days after treatment.
[4] The tests on toxicity to Mexican bean beetle adults were run in a similar manner as those against Mexican bean beetle larvae, except that adults instead of larvae of this species were confined on the treated plants.

This table shows that vinyl phosphate insecticides coming within the scope of the present invention are more toxic than "Phosdrin," a well-known commercial insecticide.

Following Table III illustrates comparative systemic insecticide activity of formulations of vinyl phosphate compounds coming within the scope of this invention. The tests were run by mixing 20 cc. of the indicated formulation with soil (107 grams dry weight) in a flower pot containing horticultural (cranberry) bean plants. One day later the plant foliage was infested with insects, and kills were noted.

This table shows that vinyl phosphate compounds coming within the scope of this invention are more active and more persistent as systemic insecticides than the commercial systemic insecticide, "Systox."

The vinyl phosphate compound of Example 3, when tested in similar manner as a systemic insecticide against Mexican bean beetle larvae and Southern armyworms showed good activity. In similar tests, the vinyl phosphate compound of Example 4 showed good systemic activity against Mexican bean beetle larvae.

Table III

| Toxicant | Formulation | Percent kill of Mexican bean beetle larvae after— | | | Percent kill of first-Instar southern armyworms after— | | |
| --- | --- | --- | --- | --- | --- | --- | --- |
| | | 7 days | 18 days | 30 days | 10 days | 17 days | 20 days |
| Vinyl phosphate from Example 1 | 1 part vinyl phosphate composition [1] in 319 parts $H_2O$ | 100 | 100 | | 100 | 100 | 100 |
| Do | 1 part vinyl phosphate composition [1] in 639 parts $H_2O$ | 100 | 100 | | | | 85 |
| Do | 1 part vinyl phosphate composition [1] in 1279 parts $H_2O$ | | | | | | 75 |
| Do | 1 part vinyl phosphate composition [1] in 159 parts $H_2O$ | | | 100 | | | |
| Vinyl phosphate from Example 2 | 1 part vinyl phosphate composition [1] in 319 parts $H_2O$ | 100 | 100 | | 100 | 100 | 85 |
| Do | 1 part vinyl phosphate composition [1] in 639 parts $H_2O$ | 100 | 100 | | 31.2 | | 65 |
| Do | 1 part vinyl phosphate composition [1] in 1279 parts $H_2O$ | | | 100 | | | 75 |
| "Systox" [2] | 1 part "Systox" composition [1] in 319 parts $H_2O$ | 100 | 100 | | 45 | | 75 |
| Do | 1 part "Systox" composition [1] in 639 parts $H_2O$ | 100 | | | 4.3 | | 40 |
| Do | 1 part "Systox" composition [1] in 1279 parts $H_2O$ | 100 | | | | | 70 |
| Do | 1 part "Systox" composition [1] in 159 parts $H_2O$ | | | 7.7 | | | |

[1] 4.8 grams of vinyl phosphate or "Systox" compound dissolved in acetone to 100 cc.
[2] A commercial insecticide comprising O,O-diethyl O (and S)-2-(ethylthio) ethylphosphorothioates.

From the foregoing it is apparent we have discovered a series of novel and valuable compounds possessing outstanding value as insecticides, particularly as systemic insecticides.

Since various changes and modifications may be made in the invention without departing from the spirit thereof, the invention is to be taken as limited only by the scope of the appended claims.

We claim:
1. A vinyl phosphate compound having the following general formula:

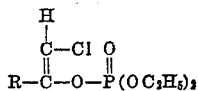

in which R is a member of the group consisting of dichlorophenyl and 2-fluoro-5-bromophenyl radicals.

2. A vinyl phosphate compound having the following general formula:

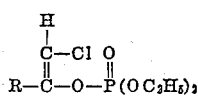

in which R is a dichlorophenyl radical.

3. The vinyl phosphate compound having the following formula:

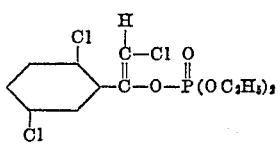

4. The vinyl phosphate compound having the following formula:

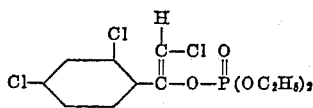

5. An insecticide composition containing as active toxic ingredient a vinyl phosphate compound having the following general formula:

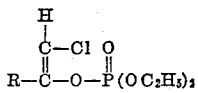

in which R is a member of the group consisting of dichlorophenyl and 2-fluoro-5-bromophenyl radicals, together with a carrier therefor.

6. An insecticide composition containing as active toxic ingredient a vinyl phosphate compound having the following general formula:

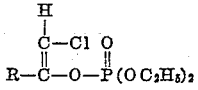

in which R is a dichlorophenyl radical, together with a carrier therefor.

7. An insecticide composition containing as active toxic ingredient the vinyl phosphate compound having the following formula:

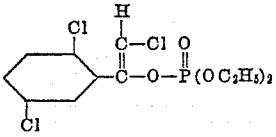

together with a carrier therefor.

8. An insecticide composition containing as active toxic ingredient the vinyl phosphate compound having the following formula:

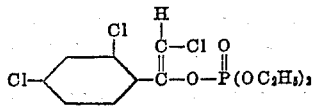

together with a carrier therefor.

9. A method of combatting insects which comprises subjecting said insects to the action of a vinyl phosphate compound having the following general formula:

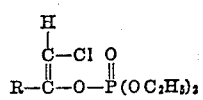

in which R is a member of the group consisting of dichlorophenyl and 2-fluoro-5-bromophenyl radicals.

10. A method of combatting insects which comprises subjecting said insects to the action of a vinyl phosphate compound having the following general formula:

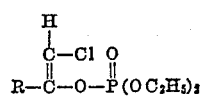

in which R is a dichlorophenyl radical.

11. A method of protecting a living plant against attack by insects which comprises applying to the soil in which the plant is growing a vinyl phosphate compound having the general formula:

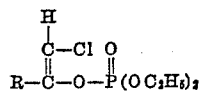

in which R is a member of the group consisting of dichlorophenyl and 2-fluoro-5-bromophenyl radicals.

12. A method of protecting a living plant against attack by insects which comprises applying to the soil in which the plant is growing a vinyl phosphate compound having the general formula:

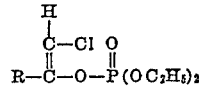

in which R is a dichlorophenyl radical.

13. A method of combatting insects which comprises subjecting said insects to the action of the vinyl phosphate compound having the following formula:

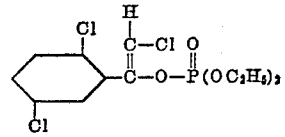

14. A method of combatting insects which comprises subjecting said insects to the action of the vinyl phosphate compound having the following formula:

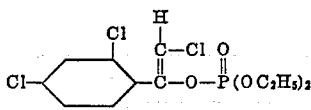

15. The vinyl phosphate compound having the following formula:

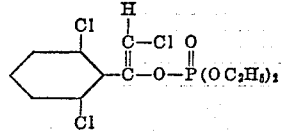

16. The vinyl phosphate compound having the following formula:

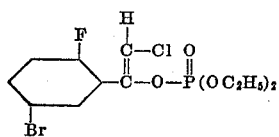

17. An insecticide composition containing as active toxic ingredient the vinyl phosphate compound having the following formula:

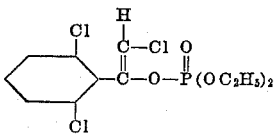

together with a carrier therefor.

18. An insecticide composition containing as active toxic ingredient the vinyl phosphate compound having the following formula:

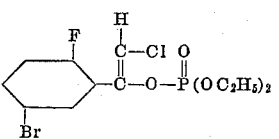

together with a carrier therefor.

19. A method of combatting insects which comprises subjecting said insects to the action of the vinyl phosphate compound having the following formula:

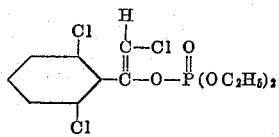

20. A method of combatting insects which comprises subjecting said insects to the action of the vinyl phosphate compound having the following formula:

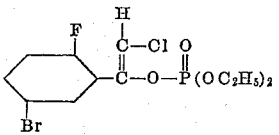

References Cited in the file of this patent

UNITED STATES PATENTS

| | | |
|---|---|---|
| 2,615,038 | Moyle | Oct. 21, 1952 |
| 2,630,450 | Harman | Mar. 3, 1953 |
| 2,769,743 | Mattson | Nov. 6, 1956 |
| 2,828,241 | Birum | Mar. 25, 1958 |
| 2,956,073 | Whetstone et al. | Oct. 11, 1960 |

FOREIGN PATENTS

| | | |
|---|---|---|
| 941,972 | Germany | Apr. 26, 1956 |